United States Patent
Fata et al.

(10) Patent No.: US 9,100,302 B2
(45) Date of Patent: Aug. 4, 2015

(54) METHODS AND SYSTEMS FOR MONITORING MULTICAST AVAILABILITY

(71) Applicant: NOMURA HOLDINGS, INC., Tokyo (JP)

(72) Inventors: Matthew Fata, Wayne, NJ (US); Anthony Virtuoso, Hawthorne, NJ (US)

(73) Assignee: NOMURA HOLDINGS, INC., Tokyo (JP)

( * ) Notice: Subject to any disclaimer, the term of this patent is extended or adjusted under 35 U.S.C. 154(b) by 148 days.

(21) Appl. No.: 13/740,881

(22) Filed: Jan. 14, 2013

(65) Prior Publication Data

US 2013/0182580 A1    Jul. 18, 2013

Related U.S. Application Data

(60) Provisional application No. 61/586,296, filed on Jan. 13, 2012.

(51) Int. Cl.
*H04L 12/26* (2006.01)
*H04L 12/18* (2006.01)
*H04L 12/24* (2006.01)

(52) U.S. Cl.
CPC .......... *H04L 43/0823* (2013.01); *H04L 12/185* (2013.01); *H04L 41/12* (2013.01); *H04L 43/10* (2013.01); *H04L 41/046* (2013.01)

(58) Field of Classification Search
None
See application file for complete search history.

(56) References Cited

U.S. PATENT DOCUMENTS

| 7,318,179 B1 | 1/2008 | Fernandes |
| 7,388,877 B2 | 6/2008 | Ota et al. |
| 7,428,540 B1 | 9/2008 | Coates et al. |
| 2003/0069930 A1 | 4/2003 | Van Willigen |

(Continued)

FOREIGN PATENT DOCUMENTS

GB    2398207    8/2004

OTHER PUBLICATIONS

Sun StorageTek NAS OA Administration Guide. Manual [Online] Sun Microsystems, Inc. [retrieved on Jul. 3, 2013] Retrieved from the Internet: <URL: http://docs.oracle.com/cd/E19805-01/819-4284-11/819-4284-11.pdf> p. 83.

(Continued)

*Primary Examiner* — Kerri Rose
(74) *Attorney, Agent, or Firm* — Stroock & Stroock & Lavan LLP

(57) ABSTRACT

Differences in the way a network and a host operating system handle multicast traffic is used to create a passive monitoring construct that measures both multicast availability and isolation. In one aspect, a computer registers a multicast group with a network to multicast a simple heartbeat message; consumer computers look for this heartbeat to detect multicast failures. In another aspect, a heartbeat is generated on the same multicast group that is being monitored but on a different port than the application traffic for this multicast group. The network routes the heartbeat packets identically to those of the application data but the heartbeat packets are instead delivered to a monitoring process and not the end application on arrival at the consumer computer. A correlating computer serves as a stateful warehouse of all multicast publisher and consumer information using information obtained by client-side agents. Using information of who is publishing and who the consumers in the various parts of the network actually see, island detection and network failures can be detected.

47 Claims, 9 Drawing Sheets

(56) References Cited

U.S. PATENT DOCUMENTS

| | | | |
|---|---|---|---|
| 2003/0210685 A1* | 11/2003 | Foster et al. | 370/389 |
| 2004/0047354 A1* | 3/2004 | Slater et al. | 370/400 |
| 2004/0148348 A1* | 7/2004 | Holt et al. | 709/204 |
| 2005/0086469 A1 | 4/2005 | Dunagan et al. | |
| 2006/0285509 A1 | 12/2006 | Asplund | |
| 2007/0250590 A1 | 10/2007 | Flannery et al. | |
| 2010/0205237 A1 | 8/2010 | El-Nakhily et al. | |
| 2010/0303082 A1* | 12/2010 | Wood | 370/400 |
| 2011/0228773 A1* | 9/2011 | Dholakia et al. | 370/390 |

OTHER PUBLICATIONS

International Search Report and Written Opinion from International application No. PCT/US13/21436, issued Mar. 20, 2013.

* cited by examiner

METHODS AND SYSTEMS FOR MONITORING MULTICAST AVAILABILITY

CROSS-REFERENCE TO RELATED APPLICATIONS

This application claims the benefit of U.S. Provisional Application No. 61/586,296, filed Jan. 13, 2012, the contents of which are incorporated herein by reference.

BACKGROUND OF THE INVENTION

1. Field of the Invention

The present invention generally relates to networks. More specifically, the present invention relates to systems and methods for monitoring the availability of a network and, in preferred embodiments, the monitoring of availability of one or more nodes in a multicast network environment.

2. Description of the Related Art

At a high level of abstraction, a network may be thought of as a series of communicatively coupled nodes, which exchange information with each other. Non-limiting examples of nodes include client computing devices and platforms (e.g., personal computers, cellular telephones, tablet computers, etc.), routers, switches, servers and the like. Some nodes may generate information, such as servers; others may consume this generated information, such as client computing platforms, while yet others simply relay the information from one node to another, such as routers and switches. As data is transmitted from a source node to a destination node, it may pass through a series of intermediate nodes along the way. Often there is a one-to-one correspondence between source and destination nodes, which is termed unicast routing. Alternatively, a single source node may transmit generated data to a plurality of destination nodes, which is termed multicast routing. IP multicast is an example of a multicast routing method that is commonly employed in networks.

Determining communication failures within unicast routing is relatively easy, as the source node has advance knowledge of exactly who it wishes to communicate with and a lack of acknowledgement from the destination node back to the source node is construed by the source node as a communications failure. In multicast routing, however, the situation may become more complex, as the source node may not have advance knowledge of all the destination nodes. Typically, multicast routing is setup in a network in such a manner that the source node needs only to transmit a single instance of the generated data to another node; the intermediate nodes in the network replicate this source data as many times as needed to finally reach the multiple destination nodes.

Using IP multicast by way of example, a multicast source node uses a group address as a destination address for the data it wishes to transmit to multiple destination nodes. The destination nodes, in turn, use this group address to inform the network that they wish to receive packets sent to that group; that is, the destination node joins the source node's group. As a result, the source node does not need, or even have, advance knowledge of the destination nodes. Rather, it is nodes that are close to the destination nodes that keep track of replicating and distributing the multicast data. Under this framework, then, the source node cannot tell if a destination node has not received the multicast data, which can lead to problems in the network.

All users of multicast routing for communications fan out, particularly in distributed multi-publisher and consumer systems, which have a critical need for visibility into the health of multicast flows between components of the network. When this communication breaks down the result is often a non-trivial degradation of application performance or functionality. By way of example, the following two scenarios illustrate potential issues with traditional multicast network environments.

The first example involves a "split-brain" scenario in hot-hot application instances, as may occur, for example, in the trading of securities in the context of Smart Order Routing ("SOR"). As illustrated in FIG. 1, a network 10 implements SOR using a common distributed application architecture, in which SOR applications 22, 24 run as instances on destination nodes 20. In this grid-like architecture, redundant SOR instances 22, 24 off of (i.e., within the domain of) a parent node 12 are run in a so-called "Hot/Hot" configuration. A first SOR instance 22 is active and handles the processing of trades. A second SOR instance 24 serves as a data recovery (DR) backup instance in the event of failure of the primary SOR instance 22.

Problems can arise when communication between some or all of the components becomes limited, leading to a so-called "split brain." When a split brain condition arises, parts of the application on separate, non-communicating components may have conflicting internal views of the network and data. FIG. 1 illustrates an example in which SOR 2 and SOR 2-DR both work the same order because SOR 2-DR, due to a limited ability to communicate with the network 10, as indicated by the corresponding dashed arrow, wrongly determines that SOR 2 is not functioning and so switches from backup mode to primary mode. As a result, both SOR 2 and SOR 2-DR work the same order.

FIG. 2 illustrates a multicast network environment 30 that includes a basic ticker plant 32, 34, such as that offered under the tradename Wombat or alternatively a custom application, publishing to a number of consuming agents 40. In this hypothetical market data environment, the publishing responsibilities are segmented into two parts: a first source 32 for securities having symbols beginning A-K, and a second source 34 for securities beginning with symbols L-Z. Destination applications 40 App 3 and App 4 are not getting source data from first publisher 32 due to a malfunction of an intermediate node 36, indicated by the corresponding dashed arrow. This is typically very difficult to detect because market data is flowing and only a limited letter range is being adversely affected. Since the letter ranges and 'splits' are often rebalanced to manage market volumes, manually configured monitoring is unmanageable because of the frequency and scale of these changes.

The current solutions on the market for detecting the above issues have difficulty scaling without adding replication burdens to the network and incurring considerable costs. Typically, specialty network monitoring hardware, such as numerous Corvill or NetScout probes, for example, are required in addition to added replication on the network components themselves. It is therefore desirable to have methods and related systems that can monitor availability of one or more nodes in a multicast network environment in a robust manner without unduly burdening the network or introducing excessive costs.

SUMMARY OF EMBODIMENTS

One aspect includes a method and related system for determining multicast availability in a network. A sentinel (e.g., software module, application or process on a dedicated or shared purpose computer) detects a multicast group on the network. A port on the network is further identified that is substantially unused by other applications on the network.

The detected multicast group and the identified port are then used to multicast a plurality of signaling packets over the network to consumer nodes. If a consumer fails to receive one or more of the signaling packets, an advisory is generated, indicating that a potential error in multicast availability.

Another aspect includes a system for detecting multicast errors in a network. The system includes a plurality of estate computers connected to the network, each estate computer comprising at least a central processing unit (CPU), networking hardware coupled to the CPU, and memory coupled to the CPU. The memory stores program code executable by the CPU. The estate computers include at least one source computer and at least one consumer computer. The program code on the consumer computer causes the consumer computer to identify a first multicast group, in which the consumer computer uses the first multicast group to receive first application data from the network on a first predetermined port. The program code then causes the consumer computer to use the first multicast group to listen for a plurality of signaling packets from the network using a second predetermined port, in which the second predetermined port being different from the first predetermined port, and to indicate a networking error if one or more of the signaling packets is not received. The program code on the source computer causes the source computer to identify the first multicast group, in which the source computer uses the first multicast group and first predetermined port to multicast the first application data over the network to the at least one consumer computer, and to use the first multicast group to multicast a plurality of signaling packets over the network to the at least one consumer computer using the second predetermined port.

BRIEF DESCRIPTION OF THE DRAWINGS

The various embodiments disclosed herein will be better understood when read in conjunction with the appended drawings, wherein like reference numerals refer to like components. For the purposes of illustrating aspects of the present application, there are shown in the drawings certain embodiments. It should be understood, however, that the application is not limited to the precise methods, procedures, arrangements, structures, features, embodiments, aspects, and devices shown, and the methods, procedures, arrangements, structures, features, embodiments, aspects and devices shown may be used singularly or in combination with other methods, procedures, arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE EMBODIMENTS

Methods and related systems according to various embodiments can independently support at least two separate aspects, including multicast availability and multicast island detection. Multicast availability provides the ability to independently detect the availability of multicast connectivity to destination nodes (i.e., consumers) without the need for the network or underlying applications to actively participate in such detection. Multicast island detection provides the ability to passively build up a multicast edge topology of the network by detecting consumers and source nodes (i.e., publishers) per publishing group and then shadowing this topology to detect islands, which are one or more nodes that are not in communications with another portion of the network.

Figure 1:
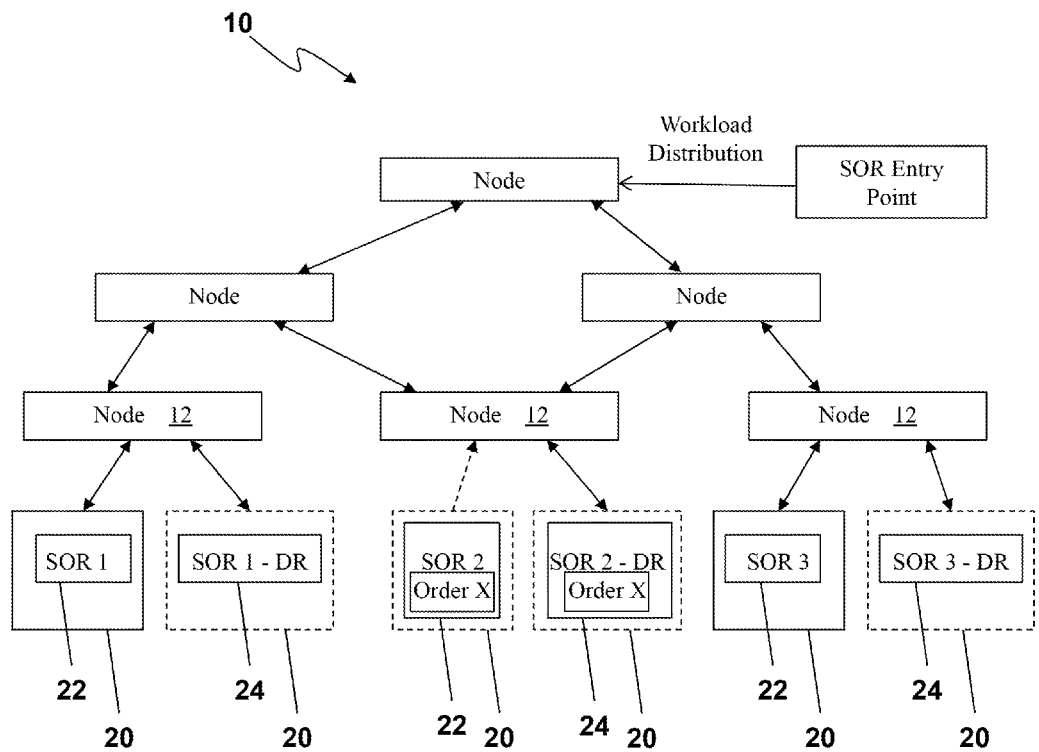
FIG. 1 illustrates a first prior art multicast scenario.
Figure 2:
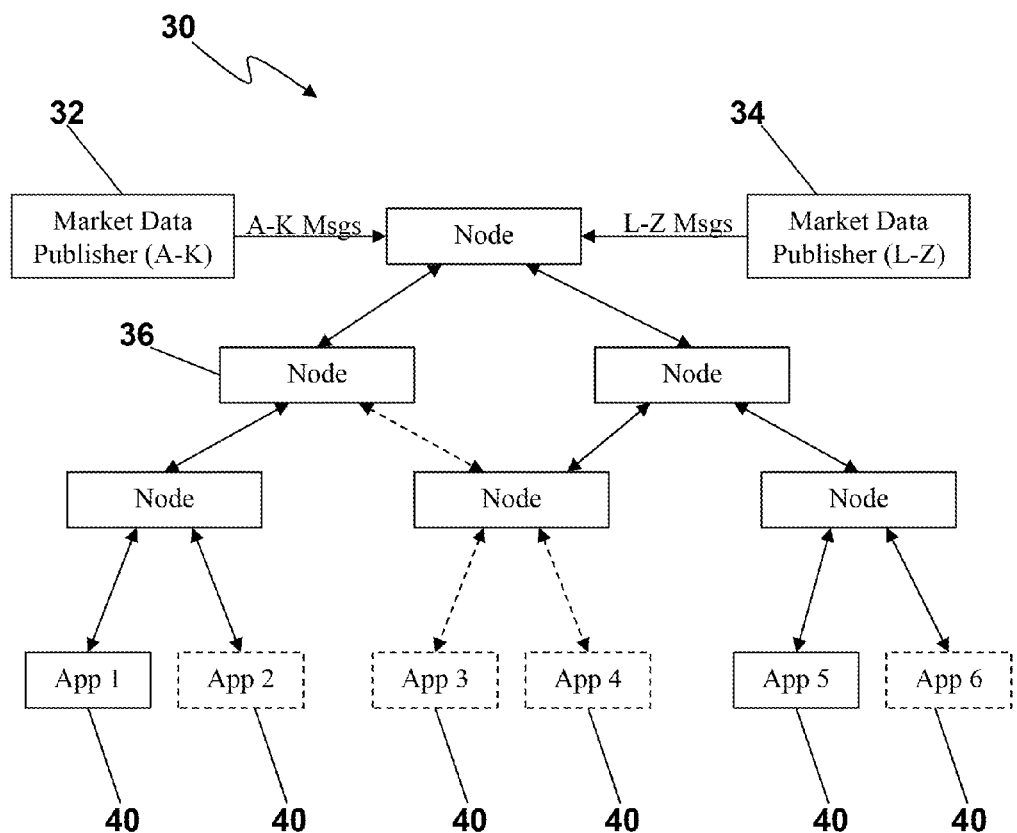
FIG. 2 illustrates a second prior art multicast scenario.
Figure 3:
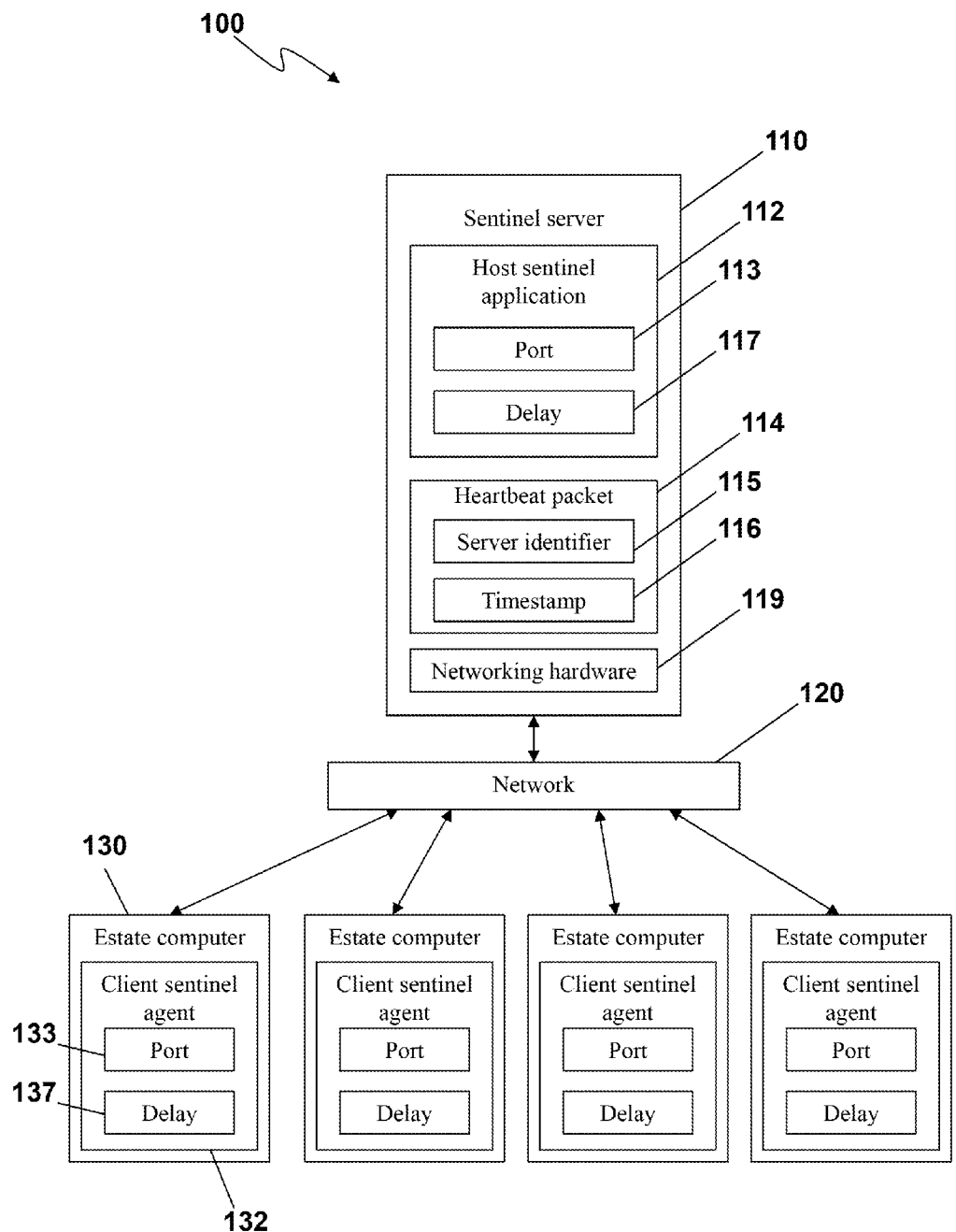
FIG. 3 illustrates a first embodiment system.
Figure 4A:
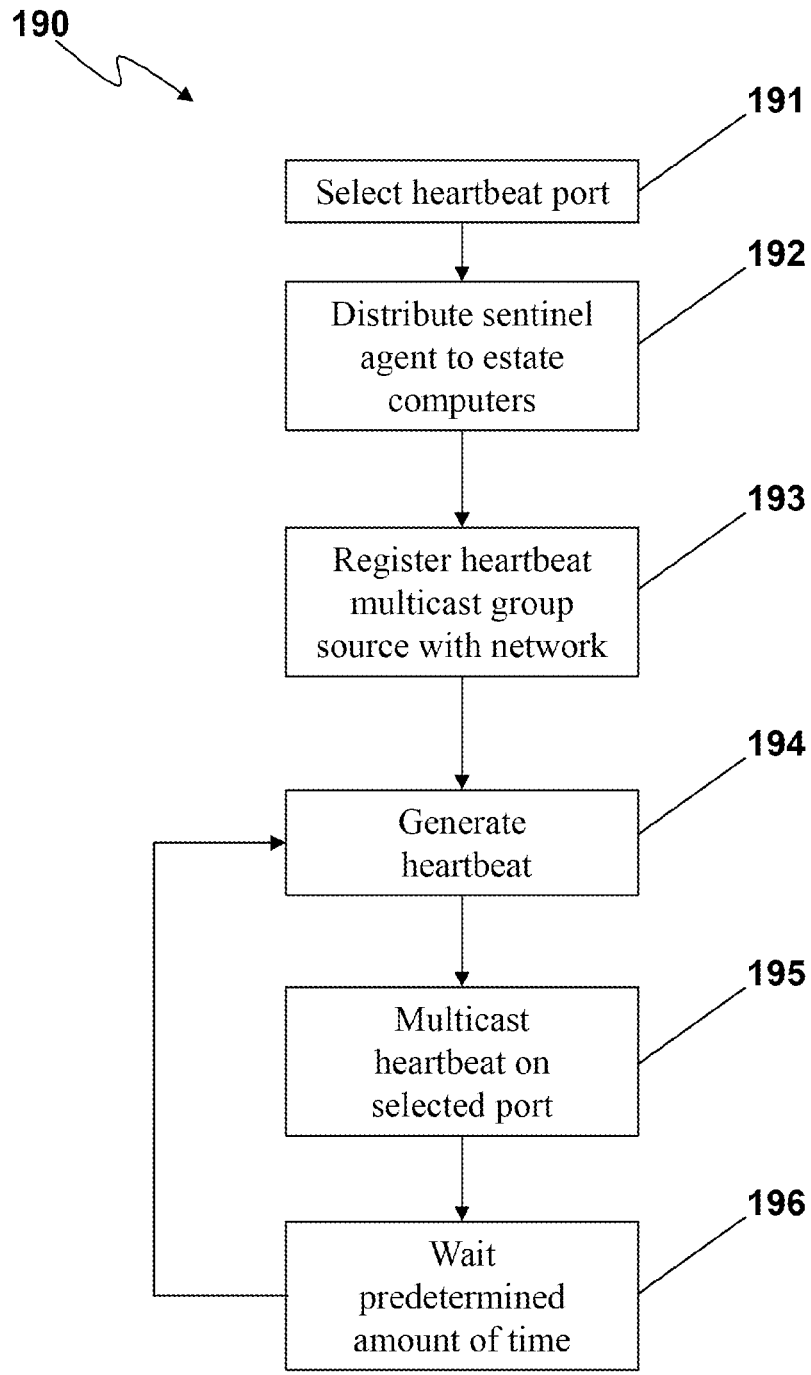
FIG. 4A is a flow chart for a sentinel server shown in FIG. 3.
Figure 4B:
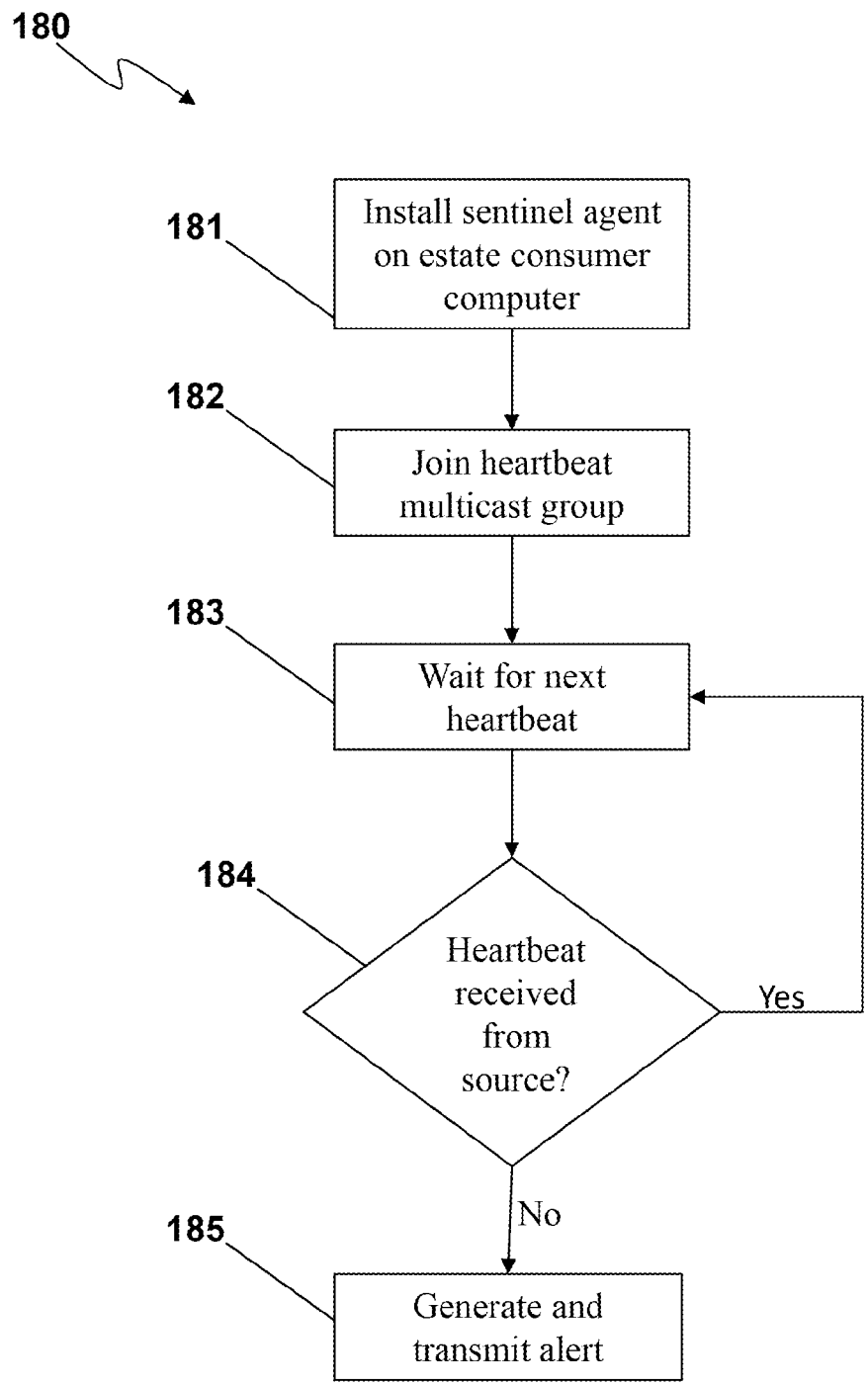
FIG. 4B is a flow chart for a sentinel agent shown in FIG. 3.

FIGS. 3, 4A and 4B illustrate a first aspect of the various embodiments, which provide systems and related methods for testing multicast availability in a network 120. In the embodiment system 100, a sentinel server 110 serves as a multicast source node for a heartbeat group, in which heartbeat packets 114, which may serve as signaling packets indicative of or for determining multicast availability, are transmitted to consumer estate computers 130 (sometimes referred to as "consumers 130") on a predetermined port 113. The sentinel server 110 can be any suitable networking-capable computing system, and will typically include at least one central processing unit (CPU) and memory. The memory holds program code in the form of a host sentinel application 112 that is executable by the CPU to perform the various steps 190 (illustrated in FIG. 4A) desired of the embodiment method on the source side for the sentinel server 110, which includes controlling conventional networking hardware 119 coupled to the CPU to interface with the network 120 as set forth in the following.

The host sentinel application 112 may be generated using any suitable programming language to perform the various method steps 190 and then loaded into the memory of the sentinel server 110 for execution by the CPU or CPUs as known in the art. Although the embodiment method 190 for the sentinel server 110 is set forth as a certain sequence of events, it will be appreciated that some steps may be performed in an order different from that discussed in the following. Turning to FIG. 4A, as an initial step 191, a heartbeat port 113 is determined that will be used to transmit a series of heartbeat packets 114 to the consumers 130. The heartbeat port 113 is preferably a port that is unused by any other applications on the network 120 and may be hardcoded into the host sentinel application 112, or, more preferably, may be a value loaded from a configuration file or the like stored in the memory of the sentinel server 110. For purposes of the following, it will be understood that a port is a logical abstraction that is typically higher in the communications protocol stack (e.g., OSI Model) used by the network 120 than the physical addresses of the nodes, and is generally used to multiplex data destined for the same physical address but different client applications; a preferred example is ports as used in the Internet Protocol standard.

As an optional step 192, the sentinel server 110 may be used as a distribution platform to provide the consumers 130 with corresponding client sentinel agents 132 that are executed on the consumer estate computers 130. Alternatively, another resource may be used to load the client sentinel agents 132 into the consumer estate computers 130, such as field personnel with computer-readable media containing the client sentinel agent 132, or the like.

When the host sentinel agent 112 first begins execution on the sentinel server 110, after configuration of the networking hardware 119 and connection to the network 120, the host sentinel application 112 performs a group registration step 193, causing the sentinel server 110 to register a new multicast publishing group with the network 120 that is used to multicast the heartbeat packets 114 to the consumers 130. This registration step may be performed in a standard manner in accordance with the particular multicast protocol employed by the network 120, such as described in the Network Working Group Request for Comment 1112 or the like. As a result, the host sentinel server 110 thus becomes a source for the multicast distribution of information, and specifically, for the multicast distribution of a series of heartbeat packets 114.

The next steps 194, 195, 196 are performed iteratively to create a series of heartbeat packets 114 that are multicast on the predetermined port 113 to the consumers 130 using a any suitable transmission method that permits the consumers 130 to detect if a heartbeat packet 114 has not been received in an expected manner.

In a preferred embodiment, the heartbeat packets 114 are sent at regular, periodic intervals. However, as discussed below, other transmission methods are also possible. In a generation step 194, a heartbeat packet 114 is created in accordance with the underlying transmission method; for purposes of the following embodiment, a regular, periodic transmission of heartbeat packets 114 is discussed. The heartbeat packet 114 preferably includes a server identifier field 115, which identifies the address of the sentinel server 110 or the network 120. This may be a physical address on the network 120, or a suitable logical address that resolves to a physical address, such as a domain name, email address or the like. The heartbeat packet 114 also preferably includes a timestamp field 116, which indicates the time when the heartbeat packet 114 was created, such as a UTC time or the like. Other fields are also possible, such as a signature field to prevent spoofing of heartbeat packets 114.

In a transmission step 195, the host sentinel application 112 causes the networking hardware 119 to multicast the most recently-created heartbeat packet 114 onto the publishing group created in the registration step 193, using the port 113 selected in the port selection step 191. This may be performed, for example, by transmitting the heartbeat packet 114 to a group address that was used during the group registration step 193, with a port value corresponding to the predetermined port 113. Taking advantage of the multicast routing protocol employed by the network 120, the network 120 will replicate the heartbeat packet 114 as many times as needed to provide each consumer 130 with the heartbeat packet 114 on the port value 113. The sentinel server 110 then waits a predetermined amount of time 117 before repeating steps 194-196 again. This predetermined amount of time 117 should be a value that is sufficiently fast as to permit timely detection of multicast errors within network 120, while not being so fast as to unnecessarily burden the network 120 with excessive heartbeat packet 114 traffic. Examples of the predetermined wait period 117 may be, for example, from 1 to 30 seconds, although it will be appreciated that such delays may be determined by specific operational needs and thus other values or ranges are certainly possible. The predetermined time value 117 may be hard-coded into the host sentinel application 112, or, more preferably, may be determined by a configuration file or the like stored in the memory of the sentinel server 110.

FIG. 4B is an illustrative method 180 of consumers 130 detecting heartbeat packets 114 multicast on the network 120. For purposes of the following, it will be understood that an estate computer 130 is any node that an organization or an individual uses or owns that connects to the network 120 and for which it is desired to determine if multicast routing is working properly. Typically, an estate computer 130 will be a client computer used by employees or the like which is intended to receive updates of application information, regular, periodic or otherwise, from one or more multicast sources (i.e., publishers).

As an initial step 181, a client sentinel agent 132 is installed onto each estate computer 130. For example, the estate computers 130 may be directed to obtain the client sentinel agent 132 from the sentinel server 110 by way of a suitable unicast protocol, such as FTP, HTTP, an email attachment or the like. Or, the client sentinel agent 132 may be installed onto each estate computer 130 by way of portable computer-readable media, as known in the art. Once installed and executed, the client sentinel agent 132 performs the various steps 182-185 used by each estate computer 130 to implement the embodiment method on the consumer side.

In a configuration step, using networking hardware present on the estate computer 130, such as a commodity NIC (e.g., 1Gig, 10Gig, etc.) the client sentinel agent 132 uses the conventional multicast protocols used by the network 120 to cause the estate computer 130 to join the heartbeat multicast publishing group discussed above in relation to the sentinel server 110. In particular, the client sentinel agent 132 listens for the heartbeat packets 114 on the predetermined port value 133, which is identical, or corresponds to, the predetermined port value 113 used by the sentinel server 110.

With regards to a specific embodiment corresponding to that if the embodiment sentinel serve 110 discussed above, in a listening step 183, the client sentinel agent 132 waits for a predetermined amount of time 137 for an incoming heartbeat packet 114 on the port 133. The predetermined amount of time 137 should be at least as great as the predetermined delay 117 used by the sentinel server 110, and is preferably a multiple of the delay 117 that is greater than 1.0. For example, the predetermined listening wait period 137 used by the estate computers 130 may be, for example, 1.5 or 2.0 times the transmit delay 117 between successive heartbeat packets 114. In this manner, intermittently dropped packets, which are not uncommon, need not generate an alert.

In an evaluation step 184, the client sentinel agent 132 determines if a heartbeat packet 114 has been received within the predetermined time period 137, or, in some embodiments, within a predetermined margin of error thereof in accordance with knowledge of the transmission method employed by the sentinel server 110. If a heartbeat packet 114 has not been received within the expected time frame, then a warning step 185 may be performed, in which an alert is generated, advising of multicast connectivity issues being present. Alternatively, an alert may be generated only if a predetermined number of (e.g., successive) heartbeat packets 114 are missed (e.g., not fully received), or if a predetermined number of heartbeat packets 114 within a sliding window have been missed (e.g., two of any successive five heartbeats), thus avoiding alarms at intermittently-dropped packets. This alert may be, for example, a warning message that appears on the screen of the adversely-affected estate computer 130, informing the user that something is amiss with the network 120 and advising the user to seek assistance from IT personnel, network diagnostic programs on the estate computer 130 or the like to resolve the multicast connectivity issue.

The warning step 185 may also include generating an advisory packet and using a unicast transmission protocol to transmit this advisory packet to another node in the network 120. In one embodiment, this other node in the network could be the sentinel serve 110 itself. Such advisory packets could be received by the sentinel server 110, which may then be read and acted upon by IT personnel in charge of the sentinel computer 110 and the estate computers 130. In yet another embodiment, an advisory packet may be sent to another node in the network 120 in which the other node is a backup computer for an application running on the adversely-affected estate computer 130. In response to receiving this advisory packet, an application on the backup computer, which application functionally corresponds to a corresponding application running on the adversely-affected estate computer 130, transitions from a backup mode to an active mode of operations, thereby taking over the application functions that were previously handled by the adversely-affected estate computer 130; the application running on the adversely-affected estate computer 130 may then transition into a quiescent or offline mode. In such a manner, network-wide applications can be assured of continuous, uninterrupted operations, despite multicast failures in parts of the network 120. If the client sentinel agent 132 determines that the warning packet was not received by the other node in the network (e.g., the sentinel computer 110 or backup computer), for example by determining that no responding acknowledgement was received, then the client sentinel agent 132 can advise the user of the estate computer 130 of a serious networking error. It will be appreciated that implementation specific regarding such alarms may be highly dependent on the support model used by the organization leveraging the embodiment methods and systems. Simply by way of example, however, alerts of the following types may be employed:

Alert Type 1: Island-Detected

Alert Description: A multicast island has been detected on group XXX.XXX.XXX.XXX (i.e., the physical address on the network) by host(s): hostname1, hostname2, etc.

Alert Severity: Medium

Alert Type 2: Multicast-Availability

Alert Description: Multicast does not appear to be propagating on XXX.XXX.XXX.XXX (i.e., physical address or address range) to host(s): hostname1, hostname2, etc.

Alert Severity: High

Of course, other types of alerts and data contained within such alerts are also possible.

On the other hand, if a heartbeat packet 114 is received within the expected transmission window, such as within the predetermined delay 137, information within the heartbeat packet 114, such as the time of reception of this heartbeat pack 114, is then used as a basis for determining when or if a subsequent heartbeat packet 114 is received; for example, the time of reception of the heartbeat packet 114 may be used as a base time from which the client sentinel agent 132 waits yet another predetermined time period 137 for reception of another heartbeat packet 114. In this manner the wait 183 and evaluate 184 steps are continuously iterated so long as the client sentinel agent 132 is running on the estate computer 130. Further, the timestamp 116 in the received packet 114 may be used to evaluate the performance of the network 120, and possibly to adjust the predetermined wait time 137.

The system 100 takes advantage of the fact that since the sentinel server 110 is such a simple data source, there is a minimal chance that any multicast transmission problem would be related to the sentinel server 110 itself but instead would far more likely be the result of a multicast topology problem within the network 120. Further, each client sentinel agent 132 may support an active mode and an inactive mode, and may be switched between the two modes based upon, for example, a user command, a command received from the network 120, internal switching based upon events detected within the estate computer 130 or the like. When active, the client sentinel agent 132 actively performs the steps discussed above to listen for the heartbeat packets 114 on the predetermined port 133. When inactive, the client sentinel agent 132 may unsubscribe from the heartbeat group, using conventional protocol techniques of the network 120, and release resources related to listening on the predetermined port 133. The client sentinel agent 132 may be placed into inactive mode, for example, when it is determined that the estate computer 130 upon which it is running is no longer actively receiving multicast feeds. When the estate computer 130 subscribes to a new multicast feed, which may be detected by the client sentinel agent 132 by monitoring communications with the network 120 and looking for such subscription or registration requests, the client sentinel agent 132 may switch back into active mode to monitor the multicasting health of the network 120 with respect to the estate computer 130.

Other methods other than periodic transmission of heartbeat packets 114 may be employed by the sentinel server 110 and estate computers 130 to determine missed heartbeat packets 114. For example, a packet 114 creation and transmission algorithm on the host sentinel application 112 may cause the heartbeat packets 114 to be transmitted in a predetermined manner that is not periodic, (i.e., at irregular intervals) but nonetheless computable and thus predetermined; any suitable algorithm as known in the art may be used. A corresponding algorithm in the client sentinel agent 132 enables the estate computer 130 to know when a heartbeat packet 114 is expected to arrive and detect dropped packets 114 accordingly. As an alternative method, the host sentinel application 112 may create heartbeat packets 114 that contain not only the timestamp 116 of the current, outgoing packet 114, but may also contain the timestamps of a predetermined number of earlier-transmitted heartbeat packets 114. The client sentinel agent 132, upon reception of a heartbeat packet 114, may compare the list of timestamps in the heartbeat packet 114 to a list of the timestamps that were present in the most recently-received earlier heartbeat packets 114, and thereby determine if any intervening heartbeat packets were dropped. Or, the heartbeat packets 114 may contain a serial number field that is increment by a predetermined amount for each successively transmitted heartbeat packet 114, thus enabling detection of missed heartbeat packets. Of course, other algorithms may also be possible for the host sentinel application 112 and the client sentinel agents 132, and any algorithm that permits detection of missed packets may be used.

Another aspect of certain embodiments may leverage differences in the way a network and a host operating system handle multicast traffic to create a passive monitoring construct that is a useful measure of both multicast availability and network isolation of estate resources. In one embodiment, a heartbeat message is generated on the same multicast publishing group that is to be monitored as a data source but on a different port than the application traffic carrying the desired data. The network routes this heartbeat packet identically to that of the application data but once the heartbeat packet reaches the host for delivery, the heartbeat will be delivered to a monitoring process on the estate computer and not the end application that has subscribed to the multicast group. This takes advantage of the fundamentally different logical layers at which the network equipment and host operating systems operate at. The result is a highly accurate and scalable multicast monitoring methodology that far outperforms even the most expensive industry offerings and at a fraction of the cost.

Figure 5:
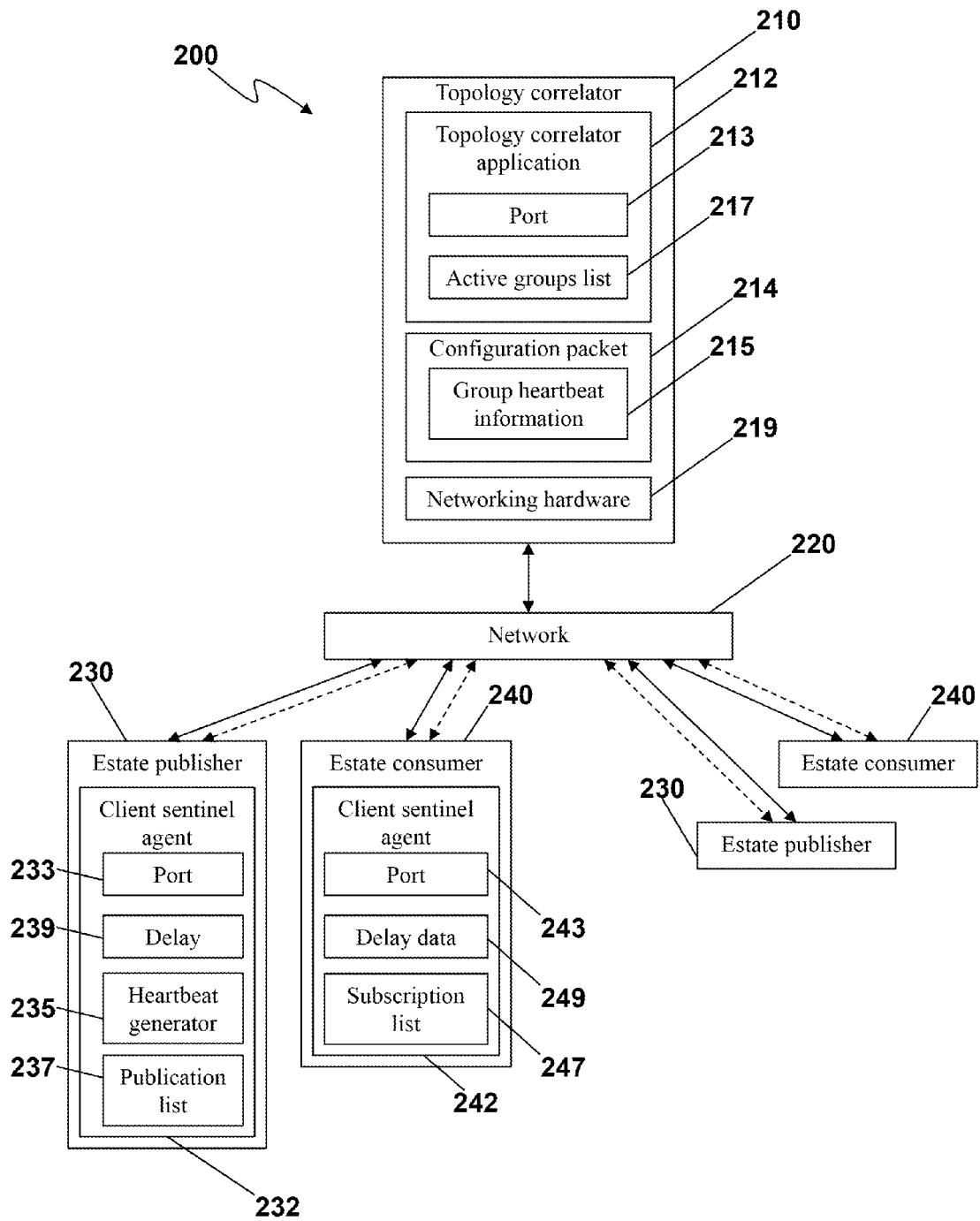
FIG. 5 illustrates a second embodiment system.
Figure 6:
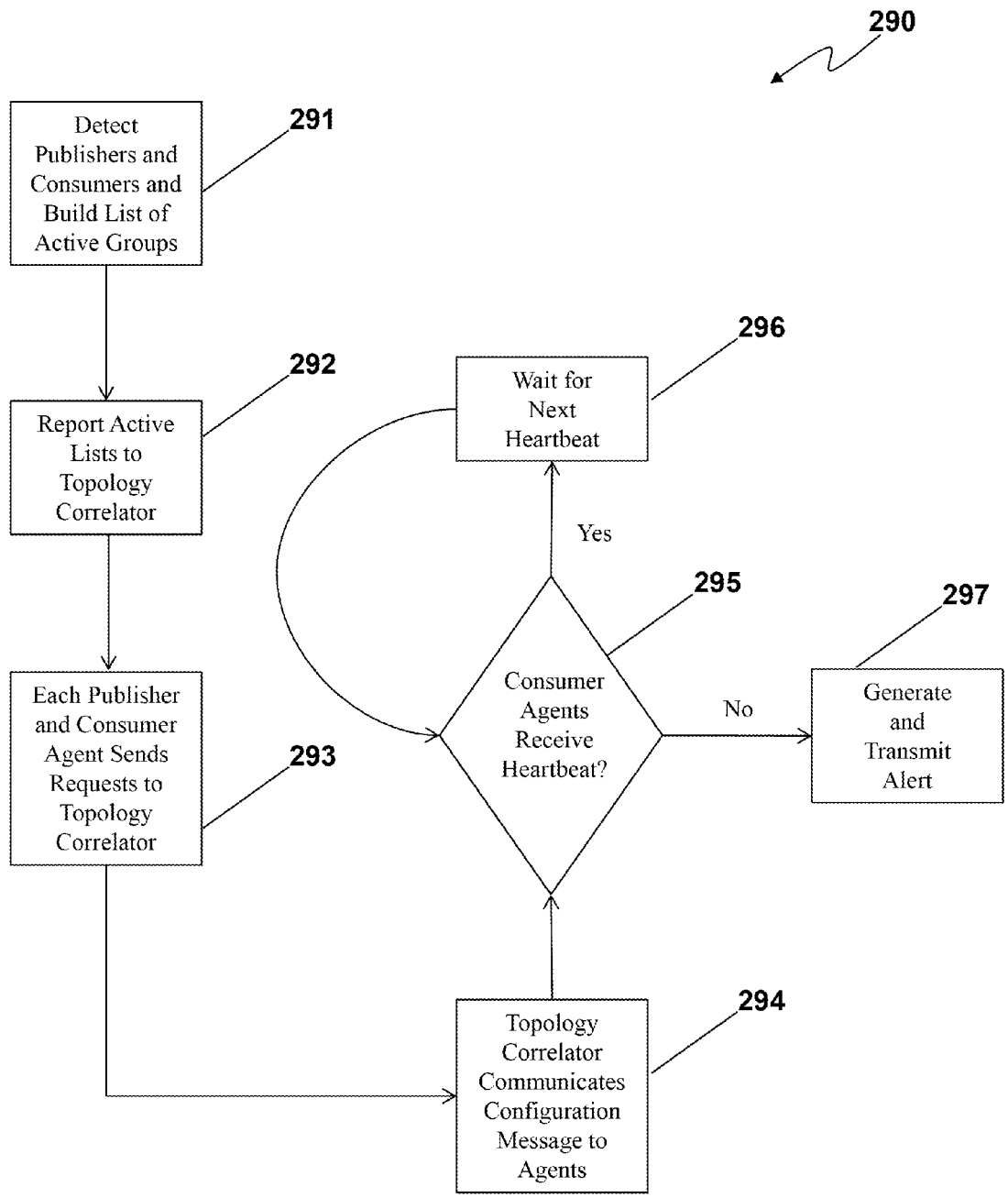
FIG. 6 is a flow chart for the system shown in FIG. 5.

An embodiment system 200 is shown in FIG. 5, with related steps 290 indicated in FIG. 6. For purposes of the following discussion, an explicit distinction is made in the figures between estate computers 230 that serve as publishers, which are nodes in the network 220 that serve as a source for multicast information, and estate computers 240 that act as consumers, which are nodes in the network 220 that join a multicast group and serve as destinations for multicast information generated by source nodes 230. It will be appreciated, however, that an estate computer 230, 240 could be, and often is, simultaneously both a publisher and a consumer of multicast data; the distinction is merely for illustrative purposes in FIG. 5. Hence, it will also be appreciated that client sentinel agent 232 installed on estate publisher computers 230 may be, and preferably is, identical to that installed on estate consumer computers 240, and performs the relevant steps disclosed below based upon the groups the estate computer 230, 240 subscribes to and groups the estate computer 230, 240 publishes to.

As an initial step, a client sentinel agent 232, 242 is installed on each estate computer 230, 240. The installation step may be performed substantially as described above with respect to the client sentinel agents 132. For example, the client sentinel agents 232, 242 may be downloaded by each estate computer 230, 240 from a predetermined source, including the sentinel server 110, if present, or a topology correlator 210, which is described in more detail below. Alternatively, the client sentinel agents 232, 234 may be installed onto each estate computer 230, 240 by way of portable computer-readable media, as known in the art.

With respect to client sentinel agents 232 installed on estate computers 230 that serve as publishers for a multicast group in the network 220, in a host configuration step 291 the client sentinel agent 232 builds a publication list 237 of all active multicast groups that the respective estate computer 230 hosts and publishes to for multicasting purposes. With respect to client sentinel agents 242 installed on estate computers 240 that serve as consumers of information received from a multicast group, for the host configuration step 291 the client sentinel agent 242 builds a subscription list 247 of all active multicast groups that the respective estate computer 240 subscribes to for multicasting purposes. Generation of the publication lists 237 and subscription lists 247 may be based upon manually entered information or on information obtained in an automated manner.

With respect to manually entered information, an IT administrator, user of the estate computer 230, 240 or other individual may edit or create a configuration file stored in the memory of the estate computer 230, 240, that explicitly contains lists relating to groups the estate computer 230 is expected to publish to, and groups the estate computer 240 is expected to join. The sentinel agent 232, 242 may read this information from the memory of the estate computer 230, 240 to generate its own internal lists 237, 247.

With respect to information obtained in an automated manner, the sentinel agent 232, 242 may monitor the network traffic of the respective estate computer 230, 240, looking for requests by the estate computer 230, 240 to create a new multicast group or to join a multicast group, respectively, and use this information to generate its internal lists 237, 247. Alternatively, or in addition, the client sentinel agents 232, 242 may leverage knowledge of management APIs for enterprise grade middleware to obtain relevant information for the publication lists 237 and subscription lists 247. It will be appreciated that the specific interfaces to such APIs will be highly implementation-specific, but as a general manner such APIs may be used to query the middleware for information relating to multicast resources, and receive in response from the APIs details concerning multicast groups to which the middleware is publishing, or from which it is consuming. This information can then be used to generate the internal lists 237, 247.

In a reporting step 292, each client sentinel agent 232, 242 reports the publication lists 237 and subscription lists 247 of its estate computer 230, 240 to the topology correlator 210, with sufficient additional information to identify the related estate computer 230, 240 and provide helpful information, such as a physical or logical network address of the related estate computer 230, 240, a time stamp, a signature, a suggested heartbeat delay (discussed in more detail below), a suggested heartbeat port (also discussed in more detail below) or the like. Reporting of this information may be performed in any suitable manner, such as by way of FTP, email, using a web service or using another proprietary protocol. Further, each time the client sentinel agent 232, 242 detects that a new multicast group is being created or destroyed, or a new multicast group is being subscribed to, the sentinel agent 232, 242 may generate a new report containing this updated publishing and subscription information of its estate computer 230, 240 and provide it to the topology correlator 210.

The topology correlator 210 may be a conventional network-capable computing platform, analogous to the sentinel server 110 discussed earlier, but containing program code executable by the CPU or CPUs to perform the various steps set forth herein. As the topology correlator 210 obtains the various respective publication lists 237 and subscriber lists 247 from the estate computers 230, 240, it generates a corresponding active groups list 217 which keeps track of all the estate computers 230 that serve as sources of multicast data, of all estate computers 240 that serve as consumers of multicast data, and both. This active groups list 217 is continuously updated with each incoming publication list 237 and subscription list 247. By correlating publishers 230 against consumers 240, and using heartbeat information received from consumers 240, it is possible for the topology correlator 210 to shadow the topology of the network 220 and to detect multicast errors in the network 220, including island detection, an embodiment of which is discussed in more detail below.

At various intervals, each estate computer 230, 240 optionally performs a configuration step 293 by sending a request to the topology correlator 210 requesting information about the active groups that may be relevant to that estate computer 230, 240. These intervals may be predetermined, such as specific times, periodically, or based upon events, such as a command from the user of the estate computer 230, 240, or the detection of an anomaly, such as a perceived error or change in the network 220, or a signal, such as received from the topology correlator 210 itself or another computing resource. In a specific example, an estate computer 240 in a backup mode may receive an advisory packet from another adversely-affected consumer 240 (as previously discussed in relation to the sentinel server 110), and in response transition into an active mode of operations, which can include joining one or more multicast groups and processing received multicast application data, thereby taking over functional operations of the adversely-affected estate computer 240, which can consequently transition into a quiescent state awaiting repairs.

In a configuration response step 294, the topology correlator 210 responds to the request by generating a corresponding configuration packet 214 for the requesting estate computer 230, 240 and transmitting this configuration packet 214 to the requesting estate computer 230, 240. In particular, the topology correlator 210 uses the active groups information 217 concerning publishers 230 and consumers 240 to provide the requesting client sentinel agent 232, 242 with a configuration packet 214 that provides group heartbeat information 215 for the estate computer 230, 240. With respect to publishers 230, the group heartbeat information 215 may indicate, for example, the port 233 on which to publish a corresponding heartbeat packet, and the periodic delay 237 (or other transmission protocol) between successive heartbeat packets, which information is used by the heartbeat generator 235 to generate corresponding heartbeat packets. This information could be, for example, different from that provided by the publishing computer 230 in the reporting step 292, effectively overriding the suggested port and delay information provided by the publishing computer 230, or could be identical. With respect to consumers 240, the group heartbeat information 215 may indicate the port or ports 243 to listen to for heartbeat packets for a specific multicast group, and the expected delay 247 between such heartbeat packets. Hence, the group heartbeat information 215 may indicate, for each multicast source, the related heartbeat port number and the related delay (or transmission protocol) for the associated heartbeat packets.

Alternatively, the reporting and configuration steps 292, 293, 294 may be omitted. Instead, each estate computer 230, 240 may be, for example, manually configured to obtain the port 233, 243 and interval delay 239, 249 information (or transmission protocol information) using any suitable configuration method, which may be stored in and retrieved from the memory of the estate computer 230, 240.

With respect to estate computers 240 that are consumers of multicast information, each estate consumer computer 240 performs listening steps 295, 296, 297 on the related port or ports 243 of the multicast group or groups it has joined and received configuration information for, waiting for heartbeat packets associated with that multicast group. No explicit multicast join is issued, since for each multicast group another corresponding application on the consumer computer 240 has already joined that group to obtain desired application data; the client sentinel agent 242, independent of this other application, is simply listening on a preferably different port 243 for the related heartbeat packets than the port used by the other application to receive the application data. Hence, there is no additional source-group multicast burden on the network 220. If no heartbeat packet is detected within the timeframe expected of the transmission protocol, such as within the associated delay interval 249, then a multicast error with the network 220 is assumed and an alert step 297 may be performed, which may be as discussed earlier with respect to the first embodiment client sentinel agent 132, including sending an advisory packet to another node 210, 230, 240 in the network 220. Network error information may be provided, for example, to the user of the estate computer 240, or, more preferably, unicast to the topology correlator 210, a corresponding backup computer 230, 240 or both. Even more preferably, if possible, such unicast transmission of the multicast transmission failure is sent over network resources that are physically different from those used for multicasting purposes in network 220. If no acknowledgment of receipt of this error information is received by the reporting consumer computer 240, then a serious error with the network 220 may be assumed and the user of the computer 240 informed accordingly.

Simultaneously, once they have their configuration information 233, 239, the estate publisher computers 230 begin generating heartbeat packets (indicated by dashed arrows) for each group that they publish to in accordance with the underlying transmission protocol for such heartbeat packets. By way of a example with a specific embodiment, in a manner analogous to the sentinel server 110, for each group that the estate computer 230 publishes to, a heartbeat generator 235 of the client sentinel agent 232 generates a heartbeat packet at regular intervals determined by the corresponding delay configuration information 239 and, together with the actual desired application data being multicast (typically by another application running in parallel on the publisher computer 230, the source application data for which is indicated by solid arrows), multicasts this heartbeat data (indicated by dashed arrows) onto the same group as the outgoing application data, but on the port indicated by the port configuration information 233 for that multicast group. This port value 233 is preferably different from the port used to transmit the application data. This is the same heartbeat packet that the consumer computers 240 are listening for, and hence the port information 233, 243 and delay information 239, 249 should correspond to each other for each multicast group. Of course, other transmission protocols for the heartbeat packets are possible, as discussed earlier with reference to the sentinel server 110. The heartbeat packet may include, for example, a logical or physical address of the publisher computer 230, one or more time stamps (or serial numbers, etc.), an identifier of the related multicast data stream, a signature, etc. It will thus be appreciated that each publisher computer 230 may transmit heartbeat packets on a unique port for each group that it publishes to, may transmit heartbeat packets on the same port for all groups it publishes to, or variations of the two. If a single port is used, information contained in the heartbeat packets may help the client sentinel agent 242 on the consumer computers 240 distinguish heartbeats from different multicast data sources.

Figure 7:
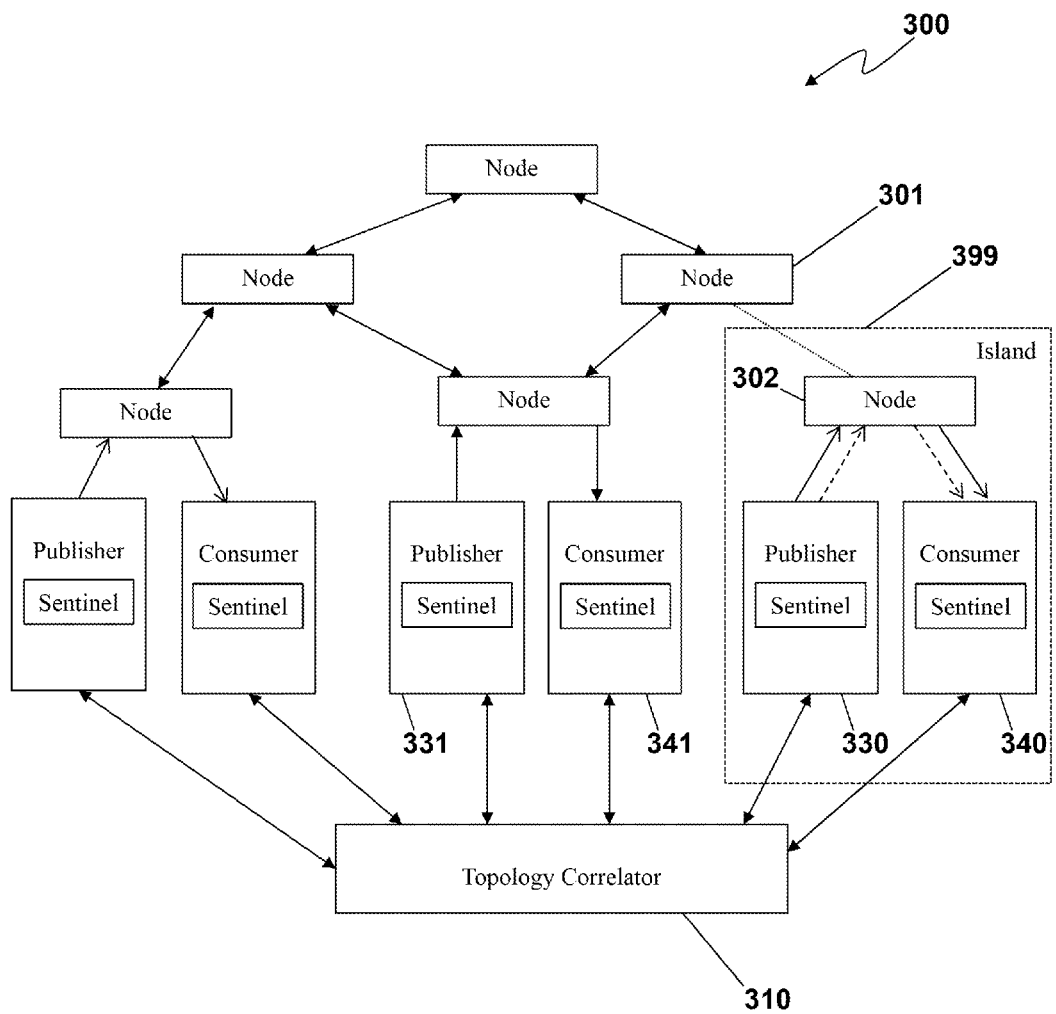
FIG. 7 illustrates the detection of network anomalies according to an embodiment of the invention.
Figure 8:
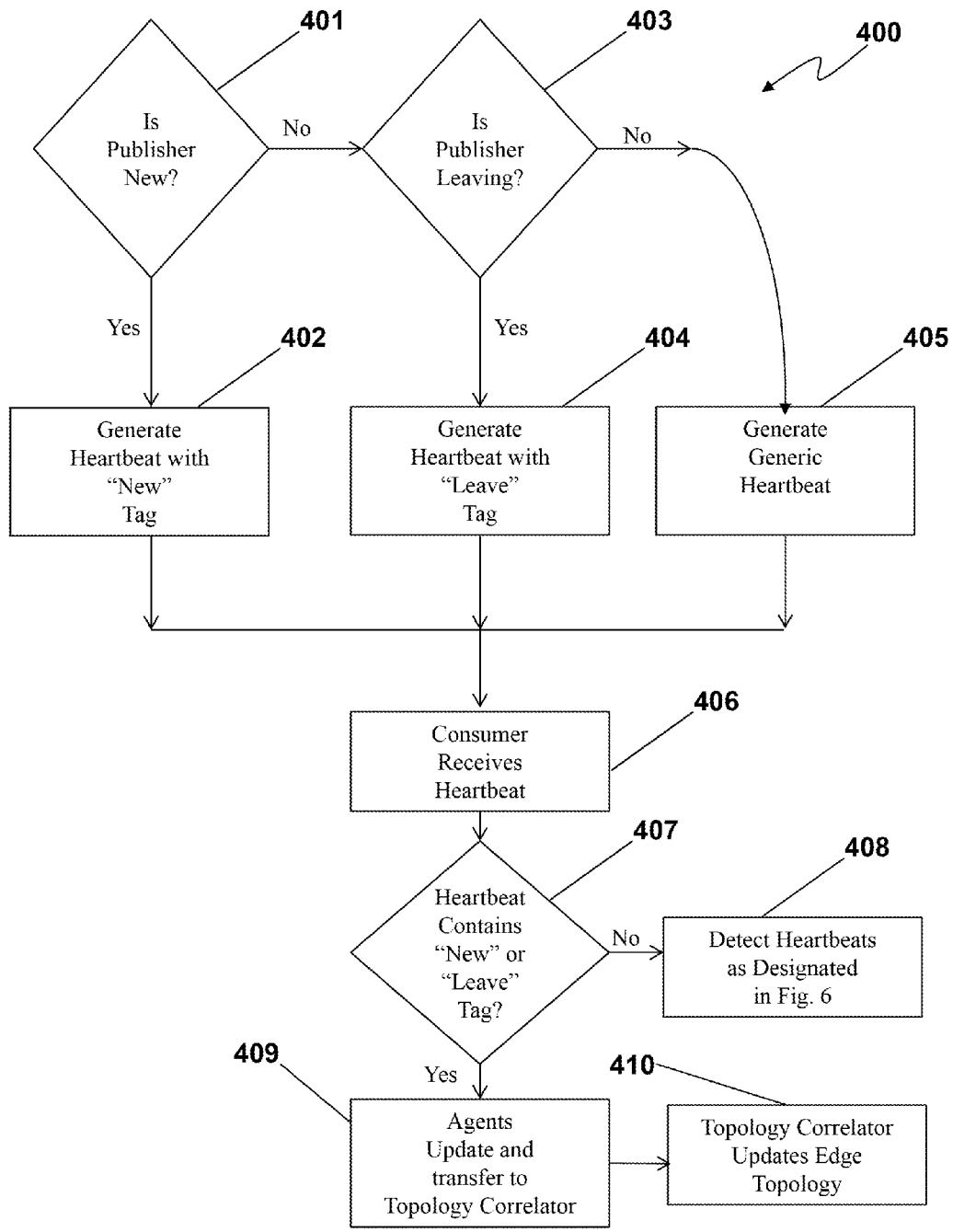
FIG. 8 is a flow chart for an alternative embodiment heartbeat creation and detection method.

FIG. 7 illustrates how islands in a multicast network can be easily detected by an embodiment system 300. In the embodiment system 300, topology correlator 310 connects to estate computers with dedicated, preferably non-multicast, communications lines, therefore ensuring that signaling messages between the estate computers and the topology correlator 310 use a different physical medium than that used for multicasting purposes. A communications failure (indicated by dashed line) between nodes 301 and 302 in the network 300 used for multicasting purposes has led to a multicast failure in the network 300 that has created an island 399 with limited multicast communications capabilities. If the communications failure is preventing multicast packets from entering the island 399 from publisher computer 331, the consumer computer 340 will similarly be unable to receive heartbeat packets corresponding to its subscribed group from publisher computer 331, and will report this network error accordingly to, for example, the topology correlator 310. Conversely, if the communications failure is preventing multicast packets from exiting the island 399, the consumer computer 341 that has subscribed to publisher computer 330 will similarly be unable to receive heartbeat packets multicast by publisher computer 330, and will report this accordingly to the topology correlator 310. This network information in the topology correlator 310 may be reviewed, for example, by troubleshooting personnel, who may review it on the topology correlator 310 or otherwise obtain is from the topology correlator 310.

The topology correlator 310 may also determine network problems on its own based upon information received from the estate computers and its own understanding of the network. For example, the memory of the topology correlator 310 may contain a master list of expected publishers and consumers of multicast data (which may be entered manually, for example), and can then compare this master list against the active groups list built from the subscription lists and publication lists received from the estate computers. Inconsistencies between the master list and the active groups list may be flagged, for example, as a potential networking error.

In certain embodiments, it may be desirable to take into account a configuration interval that may be required of the publishing (i.e., source) computers when the consumer computers are listening for heartbeats. In theory, a multicast network problem can be detected by as little as one missed heartbeat message, but in practice it may be desirable to take into account the fact that some consumers and publishers will naturally and expectedly appear and disappear in the course of normal operations of their underlying applications. To avoid false alerts, it may be desirable to take into account an auto-configuration period where the 'expected' topology of the network is updated by interrogating which groups an estate computer is publishing on and consuming from.

FIG. 7 illustrates one embodiment method 400 that takes into account configuration intervals of publishers. As indicated in step 401, it is first determined if a publisher is new; that is, if the estate computer 400 that is hosting the multicast data being published is publishing for the first time with a new multicast group. If true, then, by way of example, for a predetermined time period or number of heartbeats thereafter, in step 402 the publisher creates a corresponding heartbeat packet or packets with a "new" tag. Preferably, this predetermined time period or number of packets is configurable as it may depend upon the nature of the application generating the multicast communications; preferably, the time period is at least five minutes. Any suitable means may be used to indicate that the publisher is new by way of this "new" tag set in the heartbeat packet, such as a corresponding bit or variable being set within a field carried by the heartbeat packet. On the other hand, if the publisher is not new, then in step 403 it is determined whether or not the publisher is leaving a group, and thus multicast data for that group will no longer be available. If the publisher is leaving the group, then for a predetermined period before leaving the group or for a predetermined number of heartbeat packets (also preferably configurable), in step 404 the publisher creates a heartbeat packet or packets with a "leave" tag. Any suitable means may be used to indicate that the publisher is leaving the group, such as a corresponding bit or variable being set within a field carried by the heartbeat packet. Otherwise, in step 405 a conventional or ordinary heartbeat tag is created by the publisher.

In steps 406 and 407 the client sentinel agent on a consumer computer receives a heartbeat tag and analyzes its content. If the heartbeat packet is not tagged as "new" or "leaving," then the consumer computer process the heartbeat as discussed above in relation to FIG. 6. Alternatively, as indicated in step 409, if the heartbeat is tagged as "new" or "leaving," then the consumer computer updates its subscription list accordingly and transmits this updated subscription information to the topology correlator. In response, in step 410 the topology correlator updates its edge topology of the network as gleaned from this new information, including the active groups list and the group heartbeat information.

In certain embodiments, after each predetermined period of time, such as every 5 to 10 minutes, the consumer computers send a request to the topology correlator to resynchronize their respective understandings of the topology of the network, thus obtaining the most up-to-date information about the network from the topology correlator.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A method for determining multicast availability in a computer network having a source node, the method comprising:
   identifying a multicast group on the network, the multicast group including consumer computers;
   identifying a port on the network, the port substantially unused by applications on the network;
   multicasting a series of signaling packets over the network to the consumers, each packet sent in accordance with a predetermined transmission protocol that enables the consumer computers to detect dropped signaling packets, wherein the series of signaling packets includes a first series of signaling packets comprising information indicating that the source node is newly publishing to the multicast group; and
   in response to a consumer computer failing to receive one or more of the signaling packets, receiving an advisory packet identifying the consumer computer that failed to receive one or more of the signaling packets.

2. The method of claim 1 wherein the series of signaling packets are transmitted at regular intervals.

3. The method of claim 1 wherein identifying the multicast group comprises creating the multicast group.

4. The method of claim 1 further comprising causing the consumer computers to listen on the identified port for the signaling packets and to transmit an advisory packet if one or more signaling packets is not received.

5. The method of claim 4 further comprising providing a sentinel program on each consumer, the sentinel program configured to cause each consumer to listen on the identified port for the signaling packets and to transmit an advisory packet if one or more signaling packets is not received.

6. The method of claim 4 further comprising causing at least one of the consumer computers to transmit an advisory packet to a corresponding backup consumer computer if the one or more signaling packets is not received.

7. The method of claim 1 wherein the series of signaling packets are transmitted at irregular intervals.

8. The method of claim 1 wherein each signaling packet comprises at least one timestamp or serial number.

9. A computer comprising one or more central processing units (CPUs), networking hardware coupled to the one or more CPUs, and memory coupled to the one or more CPUs, the memory storing program code executable by the one or more CPUs to cause the computer to perform the method of claim 1.

10. A method for determining multicast availability in a computer network, the method comprising:
    a source node in the network identifying a first multicast group, wherein the source node uses the first multicast group to multicast first application data over the network on a first port to consumer computers;

the source node using the first multicast group to multicast a series of first signaling packets, each of the first signaling packets being multicast over the network to the consumer computers on a second port, the second port being different from the first port used to multicast the first application data;

the source node identifying a second multicast group, wherein second application data is received from the network on a third port using the second multicast group;

the source node listening on a fourth port for second signaling packets associated with the second multicast group, the fourth port being different from the first port and the third port; and the source node indicating a networking error if one or more of the second signaling packets is not received on the third port;

wherein the first signaling packets identify the source node for determining multicast availability of the first multicast group.

11. The method of claim 10 further comprising:
detecting joining of the second multicast group; and
using the network to transmit information concerning the second multicast group to a predetermined node in the network.

12. The method of claim 10 further comprising:
detecting creation of the first multicast group; and
using the network to transmit information concerning the first multicast group to a predetermined node in the network.

13. The method of claim 10 wherein the first signaling packets are transmitted at regular intervals.

14. The method of claim 10 wherein the first signaling packets comprise information indicating that the source node is leaving the first multicast group.

15. A computer comprising one or more processing units (CPUs), networking hardware coupled to the one or more CPUs, and memory coupled to the one or more CPUs, the memory storing program code executable by the one or more CPU s to cause the computer to perform the method of claim 10.

16. A method for determining multicast availability in a computer network, the method comprising:
a source node in the network identifying a first multicast group, wherein the source node uses the first multicast group to multicast first application data over the network on a first port to consumer computers; and
the source node using the first multicast group to multicast a series of first signaling packets, each of the first signaling packets being multicast over the network to the consumer computers on a second port, the second port being different from the first port used to multicast the first application data;
wherein the first signaling packets identify the source node for determining multicast availability of the first multicast group; and
wherein the first signaling packets comprise information indicating that the source node is newly publishing to the first multicast group.

17. A method for determining multicast availability in a computer network, the method comprising:
a consumer node in the network identifying a first multicast group, wherein the consumer node uses the first multicast group to receive first application data from the network on a first port;
the consumer node using the first multicast group to listen for a series of signaling packets from the network using a second port, the second port being different from the first port;
indicating a networking error if one or more of the signaling packets is not received;
detecting joining of the first multicast group;
using the network to transmit information concerning the first multicast group to a predetermined node in the network; and
in response to receiving a signaling packet indicating that a source node corresponding to the first multicast group is a new publisher for the first multicast group, using the network to transmit information concerning the source node being a new publisher for the first multicast group to the predetermined node in the network.

18. The method of claim 17 further comprising in response to receiving a signaling packet indicating that a source node corresponding to the first multicast group is leaving the multicast group, using the network to transmit information concerning the source node leaving the first multicast group to the predetermined node in the network.

19. The method of claim 17 wherein the networking error is indicated if one or more of the signaling packets is not received within a predetermined regular interval.

20. The method of claim 17 further comprising transmitting an advisory packet to a corresponding backup computer one the network if the one or more signaling packets is not received.

21. A computer comprising one or more central processing units (CPUs), networking hardware coupled to the one or more CPUs, and memory coupled to the one or more CPUs, the memory storing program code executable by the one or more CPUs to cause the computer to perform the method of claim 17.

22. A method for detecting multicast errors in a computer network, the method comprising:
receiving from a plurality of consumer nodes in the network information indicating each multicast group a respective consumer node is configured to receive application data from;
receiving from a plurality of source node in the network information indicating each multicast group a respective source node is configured to provide application data to;
receiving information from any one or more of the consumer nodes indicating that one or more signaling packets multicast by one or more of the source nodes has not been received, wherein signaling packets are multicast using ports that are different from ports used to multicast application data; and
using the received information to determine multicast errors in the network;
wherein the signaling packets multicast by one or more of the source nodes include a first series of signaling packets comprising information indicating that the respective one or more source nodes are newly publishing to a respective multicast group.

23. The method of claim 22 wherein determining multicast errors in the network comprises correlating failed reception of signaling packets with a multicast failure of a node in the network.

24. The method of claim 22 further comprising transmitting to each source node information indicating a port upon which the respective source node should use to transmit corresponding signaling packets.

25. The method of claim 22 further comprising transmitting to each consumer node information indicating availability of one or more source nodes for application data.

26. The method of claim 25 further comprising transmitting to each consumer node information indicating a port to listen on for reception of corresponding signaling packets from a source node.

27. The method of claim 22 further comprising receiving information from one or more source nodes indicating that the respective source node is leaving a corresponding group.

28. A computer comprising one or more central processing units (CPUs), networking hardware coupled to the one or more CPUs, and memory coupled to the one or more CPUs, the memory storing program code executable by the one or more CPUs to cause the computer to perform the method of claim 22.

29. A system for detecting multicast errors in a computer network, the system comprising a plurality of estate computers connected to the network, each estate computer comprising one or more central processing units (CPUs), networking hardware coupled to the one or more CPUs, a correlator computer communicatively connected to the network, and memory coupled to the one or more CPUs, the memory storing program code executable by the one or more CPUs;
  wherein the estate computers comprise at least one source computer and at least one consumer computer, program code on the source computer causing the source computer to:
    identify a first multicast group, wherein the source computer uses the first multicast group and a first port to multicast first application data over the network to the consumer computer; and
    use the first multicast group to multicast a series of signaling packets over the network to the consumer computer using a second port, the second port being different from the first port; and
  the program code on the consumer computer causing the consumer computer to perform the following steps:
    identify the first multicast group, the consumer computer using the first multicast group to receive the first application data from the network on the first port;
    transmit information over the network to the correlator computer to indicate a networking error if one or more of the signaling packets is not received;
    use the first multicast group to listen for each of the series of signaling packets from the network using the second port; and
    indicate a networking error if one or more of the signaling packets is not received.

30. The system of claim 29 wherein the program code on the source computer causes the source computer to transmit the signaling packets at regular intervals.

31. The system of claim 29 wherein the program code on the consumer computer further causes the consumer computer to transmit information over the network to the correlator computer indicating the first multicast group.

32. The system of claim 29 wherein the program code on the consumer computer further causes the consumer computer to receive information over the network from the correlator computer indicating availability of the first multicast group.

33. The system of claim 29 wherein the program code on the consumer computer further causes the consumer computer to receive information over the network from the correlator computer indicating a value for the second port.

34. The system of claim 29 further comprising a backup computer communicatively connected to the network, the backup computer corresponding to the consumer computer, and the program code on the consumer computer causes the consumer computer to transmit information over the network to the backup computer to indicate a networking error if one or more of the signaling packets is not received.

35. The system of claim 29 wherein the signaling packets comprise information indicating that the source computer is leaving the first multicast group.

36. A system for detecting multicast errors in a computer network, the system comprising a plurality of estate computers connected to the network, each estate computer comprising one or more central processing units (CPUs), networking hardware coupled to the one or more CPUs, and memory coupled to the one or more CPUs, the memory storing program code executable by the one or more CPUs;
  wherein the estate computers comprise at least one source computer and at least one consumer computer, program code on the source computer causing the source computer to:
    identify a first multicast group, wherein the source computer uses the first multicast group and a first port to multicast first application data over the network to the consumer computer; and
    use the first multicast group to multicast a series of signaling packets over the network to the consumer computer using a second port, the second port being different from the first port; and
  the program code on the consumer computer causing the consumer computer to perform the following steps:
    identify the first multicast group, the consumer computer using the first multicast group to receive the first application data from the network on the first port;
    use the first multicast group to listen for each of the series of signaling packets from the network using the second port; and
    indicate a networking error if one or more of the signaling packets is not received;
  wherein the system further comprises a correlator computer communicatively connected to the network, and the program code on the source computer causes the source computer to transmit information over the network to the correlator computer to indicate the first multicast group.

37. The system of claim 36 wherein the program code on the source computer further causes the source computer to receive information over the network from the correlator computer indicating a value for the second port.

38. The system of claim 36 wherein the program code on the source computer further causes the source computer to receive information over the network from the correlator computer indicating a periodic interval at which to successively transmit the series of signaling packets.

39. A system for detecting multicast errors in a computer network, the system comprising a plurality of estate computers connected to the network, each estate computer comprising one or more central processing units (CPUs), networking hardware coupled to the one or more CPUs, and memory coupled to the one or more CPUs, the memory storing program code executable by the one or more CPUs;
  wherein the estate computers comprise at least one source computer and at least one consumer computer, program code on the source computer causing the source computer to:
    identify a first multicast group, wherein the source computer uses the first multicast group and a first port to multicast first application data over the network to the consumer computer; and use the first multicast group to multicast a series of signaling packets over the network to the consumer computer using a second port, the second port being different from the first port; and the program code on the consumer computer causing the consumer computer to perform the following steps:

identify the first multicast group, the consumer computer using the first multicast group to receive the first application data from the network on the first port;

use the first multicast group to listen for each of the series of signaling packets from the network using the second port; and indicate a networking error if one or more of the signaling packets is not received;

wherein the signaling packets comprise information indicating that the source computer is newly publishing to the first multicast group.

40. A method for detecting multicast errors in a computer network, the method comprising:

identifying at least one publisher computer of multicast application data, the publisher computer multicasting application data to a publishing group on a first port;

identifying consumer computers of multicast application data;

causing the publisher computer to multicast a series of signaling packets using the publishing group on second port that is different from the first port;

causing the consumer computer to listen on the second port for each of the series of signaling packets;

indicating a networking error if one or more of the signaling packets is not received by the consumer computer; and accepting information from the consumer computer, the information indicating the publishing group and an identifier of the consumer computer.

41. The method of claim 40 further comprising providing to the consumer computer information indicating the second port.

42. The method of claim 40 further comprising providing to the consumer computer an interval at which the series of signaling packets are regularly transmitted.

43. The method of claim 40 further comprising causing a backup computer to transition into an active mode in response to detecting a network error.

44. A method for detecting multicast errors in a computer network, the method comprising:

identifying at least one publisher computer of multicast application data, the publisher computer multicasting application data to a publishing group on a first port;

identifying consumer computers of multicast application data;

causing the publisher computer to multicast a series of signaling packets using the publishing group on second port that is different from the first port;

causing the consumer computer to listen on the second port for each of the series of signaling packets;

indicating a networking error if one or more of the signaling packets is not received by the consumer computer; and accepting information from the publisher computer, the information indicating the publishing group and an identifier of the publisher computer.

45. The method of claim 44 further comprising providing to the publisher computer information indicating the second port.

46. The method of claim 44 further comprising providing to the publisher computer an interval at which the series of signaling packets are to be regularly transmitted.

47. A method for detecting multicast errors in a computer network, the method comprising:

identifying at least one publisher computer of multicast application data, the publisher computer multicasting application data to a publishing group on a first port;

identifying consumer computers of multicast application data;

causing the publisher computer to multicast a series of signaling packets using the publishing group on second port that is different from the first port;

causing the consumer computer to listen on the second port for each of the series of signaling packets;

indicating a networking error if one or more of the signaling packets is not received by the consumer computer;

accepting information from the publisher computer indicating the publishing group and an identifier of the publisher computer;

accepting information from the consumer computer indicating the publishing group and an identifier of the consumer computer; and accepting information from the consumer computer indicating a networking error when one or more of the signaling packets is not received by the consumer computer.

* * * * *